(12) United States Patent
Wang et al.

(10) Patent No.: US 12,608,970 B2
(45) Date of Patent: Apr. 21, 2026

(54) GRAPH ALGORITHM AND MOTION CAPTURE FOR IMPROVING MANUFACTURING PROCESSES

(71) Applicant: Taiwan Semiconductor Manufacturing Company, Ltd., Hsinchu (TW)

(72) Inventors: Chia-Hsi Wang, Taichung (TW); Yen-Yu Chen, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 313 days.

(21) Appl. No.: 18/190,728

(22) Filed: Mar. 27, 2023

(65) Prior Publication Data

US 2024/0331436 A1 Oct. 3, 2024

(51) Int. Cl.
| | |
|---|---|
| *G06V 40/10* | (2022.01) |
| *G06T 7/246* | (2017.01) |
| *G06V 40/20* | (2022.01) |

(52) U.S. Cl.
CPC ............ *G06V 40/103* (2022.01); *G06T 7/246* (2017.01); *G06V 40/20* (2022.01)

(58) Field of Classification Search
CPC ....... G06V 40/103; G06V 40/20; G06T 7/246
See application file for complete search history.

(56) References Cited

U.S. PATENT DOCUMENTS

| | | | | |
|---|---|---|---|---|
| 11,869,209 | B1 * | 1/2024 | McCracken, Jr. | ........ G06T 7/70 |
| 2019/0204848 | A1 * | 7/2019 | Xiong | .................. G05D 1/0268 |
| 2019/0350757 | A1 * | 11/2019 | Charles | .................. A61F 9/008 |
| 2020/0175713 | A1 * | 6/2020 | Pescaru | ............... G06V 40/103 |
| 2022/0036074 | A1 * | 2/2022 | Kashimoto | ............ G06V 40/58 |
| 2022/0269346 | A1 * | 8/2022 | Hussami | ................. G06F 3/012 |
| 2022/0331028 | A1 * | 10/2022 | Sternitzke | ............ G05D 1/0094 |

FOREIGN PATENT DOCUMENTS

CN 112762863 A * 5/2021 ............. G01B 11/26

* cited by examiner

*Primary Examiner* — Amandeep Saini
*Assistant Examiner* — Andrew S Budisalich
(74) *Attorney, Agent, or Firm* — Ingrassia Fisher & Lorenz, LLP

(57) ABSTRACT

A method of automatically detecting whether a procedure in a scheduled process has been performed is disclosed. The method includes: capturing images of a person engaged in a plurality of predetermined steps in the scheduled process; estimating a human pose of the person in the captured images that includes a plurality of body parts of the human pose; tracking movement of the plurality of body parts of the human pose; generating a movement signal based on the tracked movement of the plurality of body parts; determining based on the movement signal whether a predetermined step of the plurality of predetermined steps in the scheduled process has been performed by the person; and recording a time at which the predetermined step of the plurality of predetermined steps in the scheduled process has been performed by the person when it has been determined that the predetermined step has been performed.

20 Claims, 6 Drawing Sheets

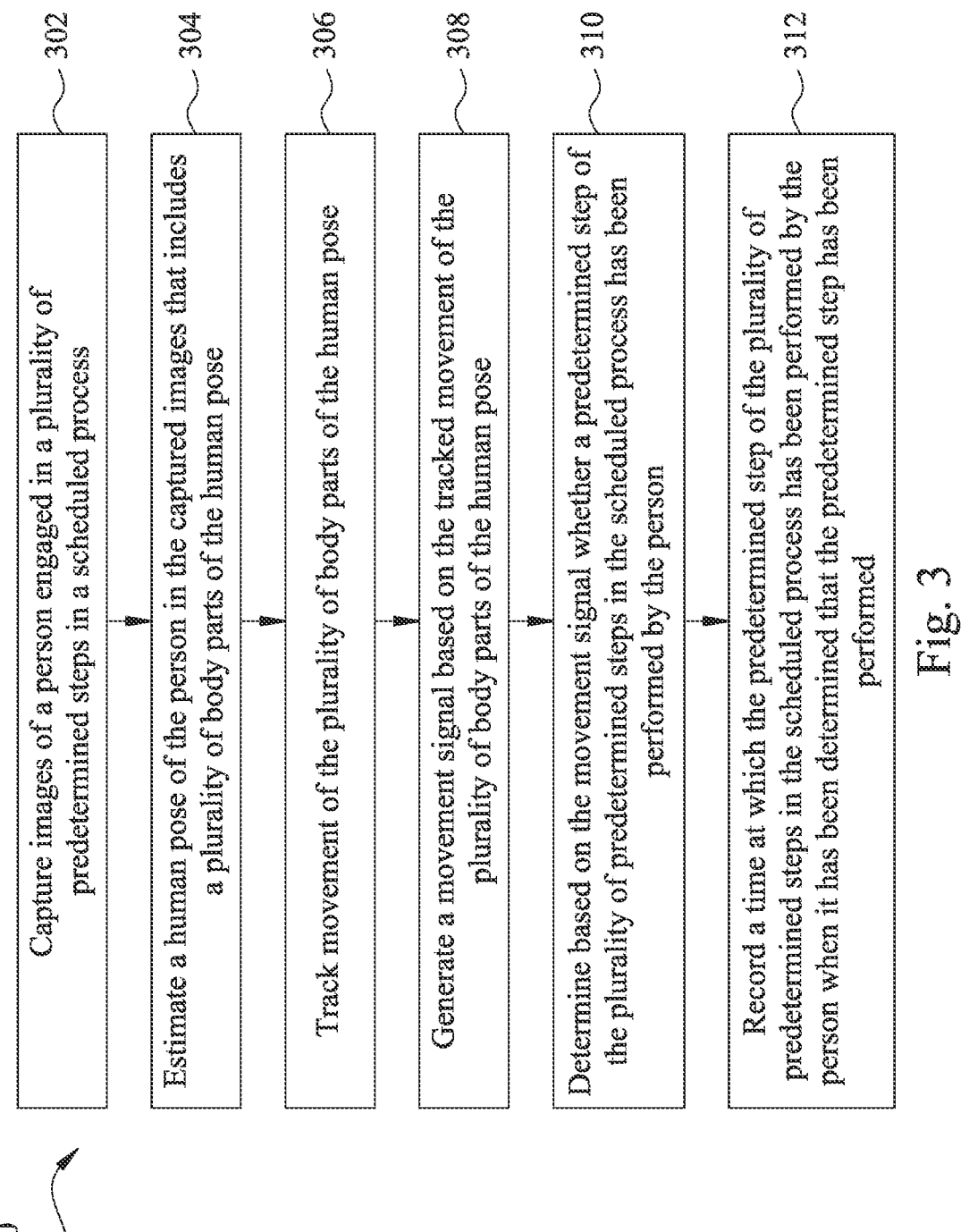

300

Capture images of a person engaged in a plurality of predetermined steps in a scheduled process

302

Estimate a human pose of the person in the captured images that includes a plurality of body parts of the human pose

304

Track movement of the plurality of body parts of the human pose

306

Generate a movement signal based on the tracked movement of the plurality of body parts of the human pose

308

Determine based on the movement signal whether a predetermined step of the plurality of predetermined steps in the scheduled process has been performed by the person

310

Record a time at which the predetermined step of the plurality of predetermined steps in the scheduled process has been performed by the person when it has been determined that the predetermined step has been performed

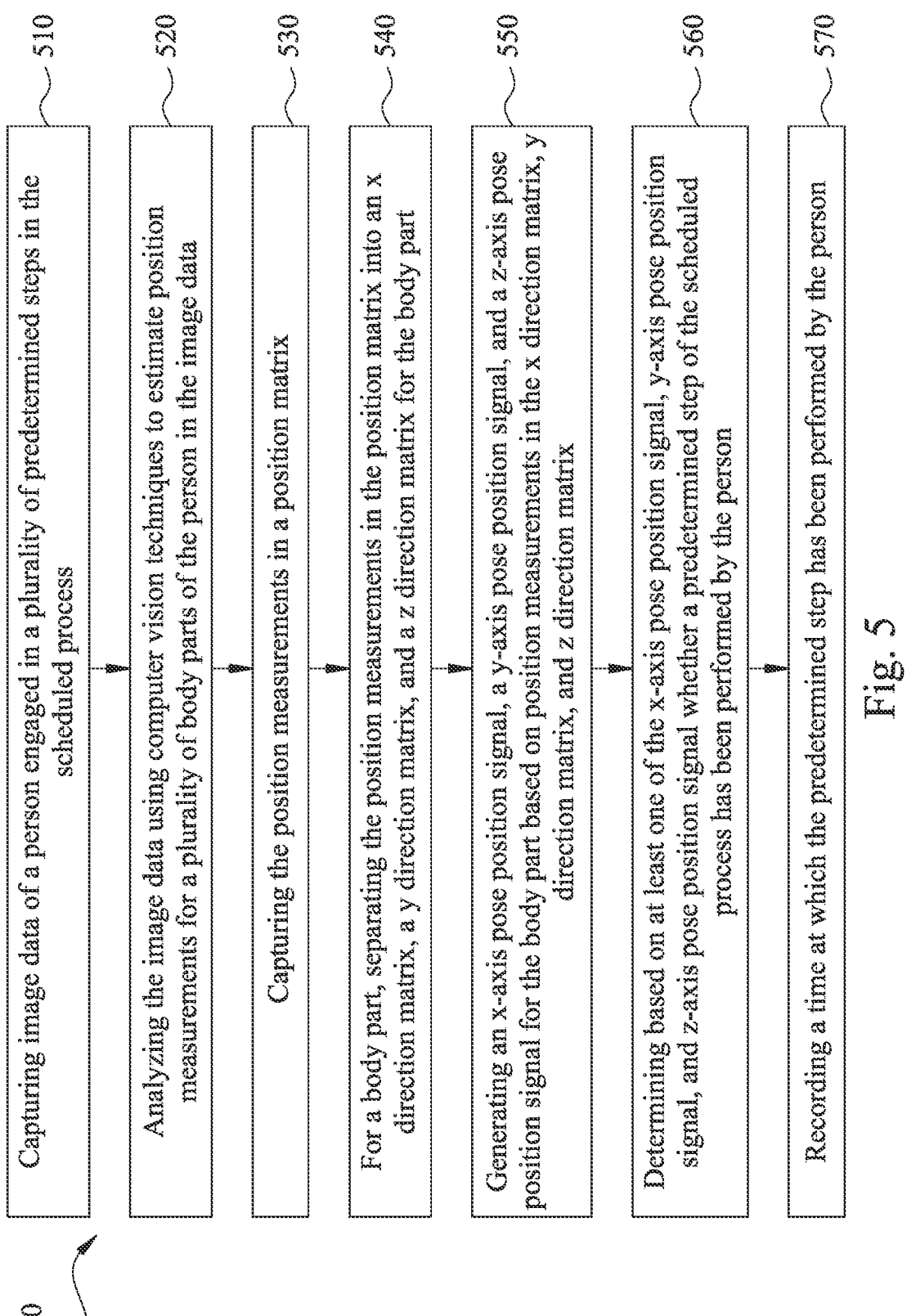

510 — Capturing image data of a person engaged in a plurality of predetermined steps in the scheduled process 520 — Analyzing the image data using computer vision techniques to estimate position measurements for a plurality of body parts of the person in the image data 530 — Capturing the position measurements in a position matrix 540 — For a body part, separating the position measurements in the position matrix into an x direction matrix, a y direction matrix, and a z direction matrix for the body part 550 — Generating an x-axis pose position signal, a y-axis pose position signal, and a z-axis pose position signal for the body part based on position measurements in the x direction matrix, y direction matrix, and z direction matrix 560 — Determining based on at least one of the x-axis pose position signal, y-axis pose position signal, and z-axis pose position signal whether a predetermined step of the scheduled process has been performed by the person 570 — Recording a time at which the predetermined step has been performed by the person

GRAPH ALGORITHM AND MOTION CAPTURE FOR IMPROVING MANUFACTURING PROCESSES

BACKGROUND

Semiconductor devices are used in a variety of electronic applications, such as, for example, personal computers, cell phones, digital cameras, and other electronic equipment. Semiconductor devices are typically fabricated by sequentially depositing insulating or dielectric layers, conductive layers, and semiconductor layers of material over a semiconductor substrate, and patterning the various material layers using lithography to form circuit components and elements thereon.

The semiconductor industry continues to improve the integration density of various electronic components (e.g., transistors, diodes, resistors, capacitors, etc.) by continual reductions in minimum feature size, which allow more components to be integrated into a given area. However, as the minimum features sizes are reduced, additional problems arise that should be addressed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a process flow chart depicting an example process of automatically detecting whether a procedure in a scheduled process has been performed, in accordance with some embodiments.

FIG. 5 is a flowchart of an example method for automatically detecting whether a procedure in a scheduled process has been performed.

DETAILED DESCRIPTION

Figure 2B:
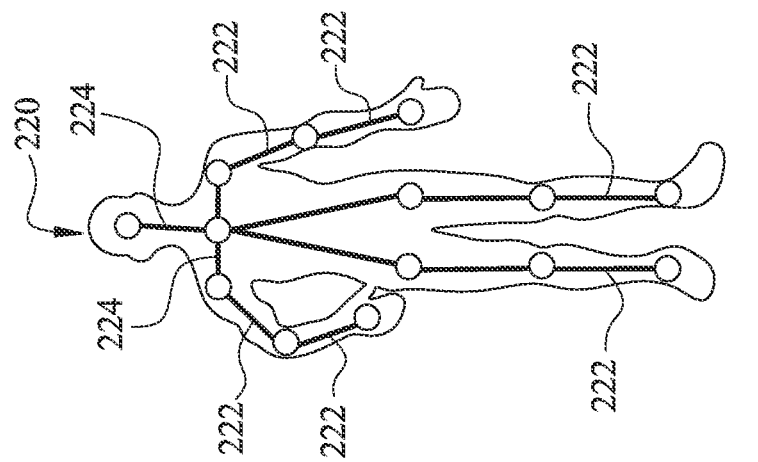
FIG. 2B is diagram depicting an example human pose skeleton, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another region, layer, or section. Thus, a first element, component, region, layer, portion, or section discussed below could be termed a second element, component, region, layer, portion, or section without departing from the teachings of the present disclosure.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Semiconductor production in advanced fabrication facilities is highly automated. Human workers, however, continue to carry out various procedures associated with fabrication. For example, for various automated processes, such as physical vapor deposition (PVD), chemical vapor deposition (CVD), and atomic layer deposition (ALD), various solid precursors and/or liquid chemicals are used with automated semiconductor processing equipment. The solid precursors and/or liquid chemicals are supplied to the semiconductor processing equipment via ampoules or other sealed containers.

The chemicals in the ampoules are sampled and checked to ensure that various chemical qualities are stable prior to the chemicals being used to fill ampoules. The chemicals, however, may not be monitored for quality again until after the ampoules containing these chemicals are installed in PVD/CVD/ALD process chambers. Human workers are used to install the ampoules and perform various monitoring steps when the ampoules are installed and prior to use in the PVD/CVD/ALD process chambers. At various times a human worker may perform checks to determine various parameters associated with the chemicals in the ampoule. The checks may include a dew point check, an O$_2$ concentration check, a filling amount check, a particle size check, and/or other checks. The human worker may follow one or more checklists when performing the checks and may be required to record the time at which various checks on the one or more checklists were performed.

In another example, automated cleaning equipment for cleaning parts may include a wet bench clean chamber having one or more fluid supplies for supplying a cleaning agent and/or rinsing agent. While the cleaning process may be automated, a human worker installs the fluid supplies and performs various monitoring steps when the fluid supplies are installed prior to use with the wet bench clean chamber. The human worker may be required to perform a clean parts check when chemicals are installed and/or at other times prior to use in the wet bench clean chamber. The clean parts check may include recording a clean time, recording a clean action (such as a water flush), recording the clean process order, and/or other operations.

In each of these examples, the human worker may perform all of the checks but may not record the times at which each check was performed. The human worker may miss performing a check at a needed time. In various embodiments, apparatus, systems, techniques, and articles are disclosed for automatically checking whether all installation and monitoring steps are performed by a human worker, which can improve the quality of various fabrication processes that rely on human worker involvement. In various embodiments, apparatus, systems, techniques, and articles are disclosed herein for automatically determining when predetermined actions were taken by a human worker and automatically recording the time at which the predetermined actions were taken. In various embodiments, apparatus, systems, techniques, and articles are disclosed herein for monitoring when predetermined actions were taken by a human worker and providing an automatic alert when a predetermined action was not taken.

In various embodiments, apparatus, systems, techniques, and articles are disclosed for automatically checking whether all installation and monitoring steps are performed by a human worker using computer vision techniques. In various embodiments, apparatus, systems, techniques, and articles are disclosed for automatically checking whether all installation and monitoring steps are performed by a human worker using a graph algorithm and motion capture techniques.

Figure 1:
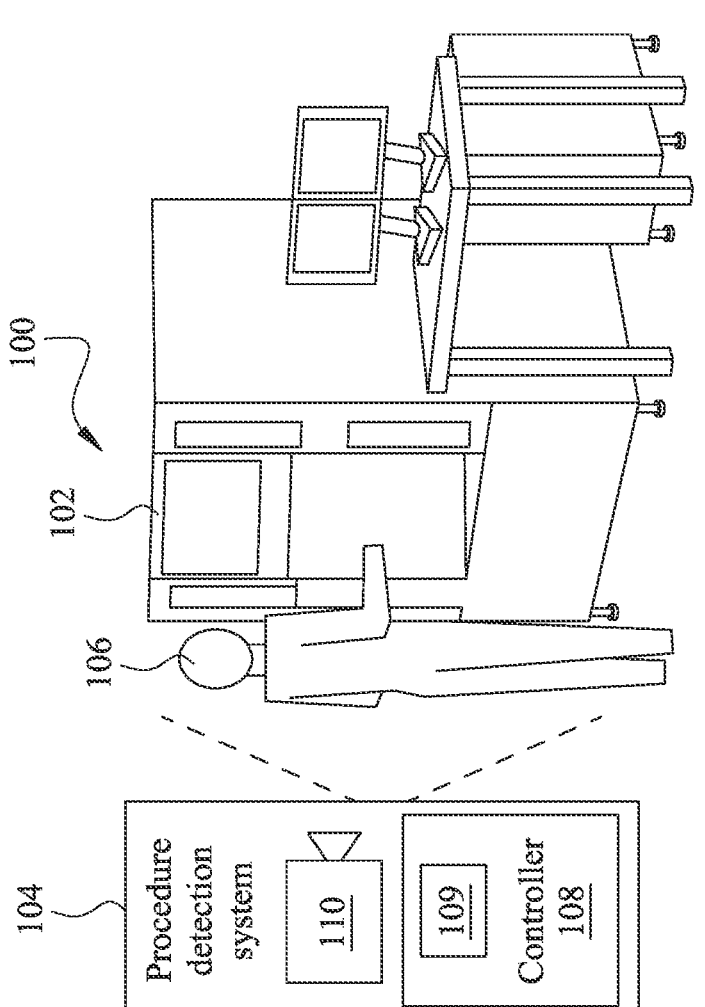
FIG. 1 is a diagram depicting an example semiconductor processing environment, in accordance with some embodiments.

FIG. 1 is a diagram depicting an example semiconductor processing environment 100. The example semiconductor processing environment 100 includes a processing chamber 102 (e.g., a PVD. CVD. ALD, or wet clean process chamber) for performing automated semiconductor fabrication operations and a procedure detection system 104 for automatically detecting whether installation and/or monitoring steps were performed by a human worker 106.

The example procedure detection system 104 includes a controller 108 with a communication mechanism 109, and an imaging device 110. The controller 108 can include any suitable computer system (e.g., workstation and/or portable electronic device) to store programming instructions and data for processing output from the imaging device 110, performing logic, calculations, methods, and/or algorithms, and generating output corresponding to actions taken by an observed human worker 106.

The programming instructions may include one or more separate programs, each of which comprises an ordered listing of executable instructions for implementing logical functions. The one or more instructions of the controller 108, when executed, configure the controller 108 to analyze images from the imaging device 110 to automatically detect whether installation and/or monitoring steps were performed by a human worker 106. The different functions of the controller 108 are not limited by the embodiments of the present disclosure.

The example communication mechanism 109 can include any suitable network device or system for providing a network connection between the controller 108 and the imaging device 110. For example, the communication mechanism 109 can provide a local area network (LAN) and/or a WiFi network. In some embodiments, imaging device 110 can transmit images through the communication mechanism 109 to controller 108 for image analysis and other functions of the controller 108.

The example imaging device 110 produces image data, such as images, videos, and/or camera streams, for analysis by the procedure detection system 104. The example imaging device 110 may include a camera, webcam, forward-looking infrared (FLIR) camera, Point Grey camera, CCD camera, CMOS digital camera, Internet protocol (IP) camera, closed-circuit television camera (CCTV), custom input source (such as depth cameras, stereo lens cameras, etc.), or other imaging device.

Figures 2A, 2C:
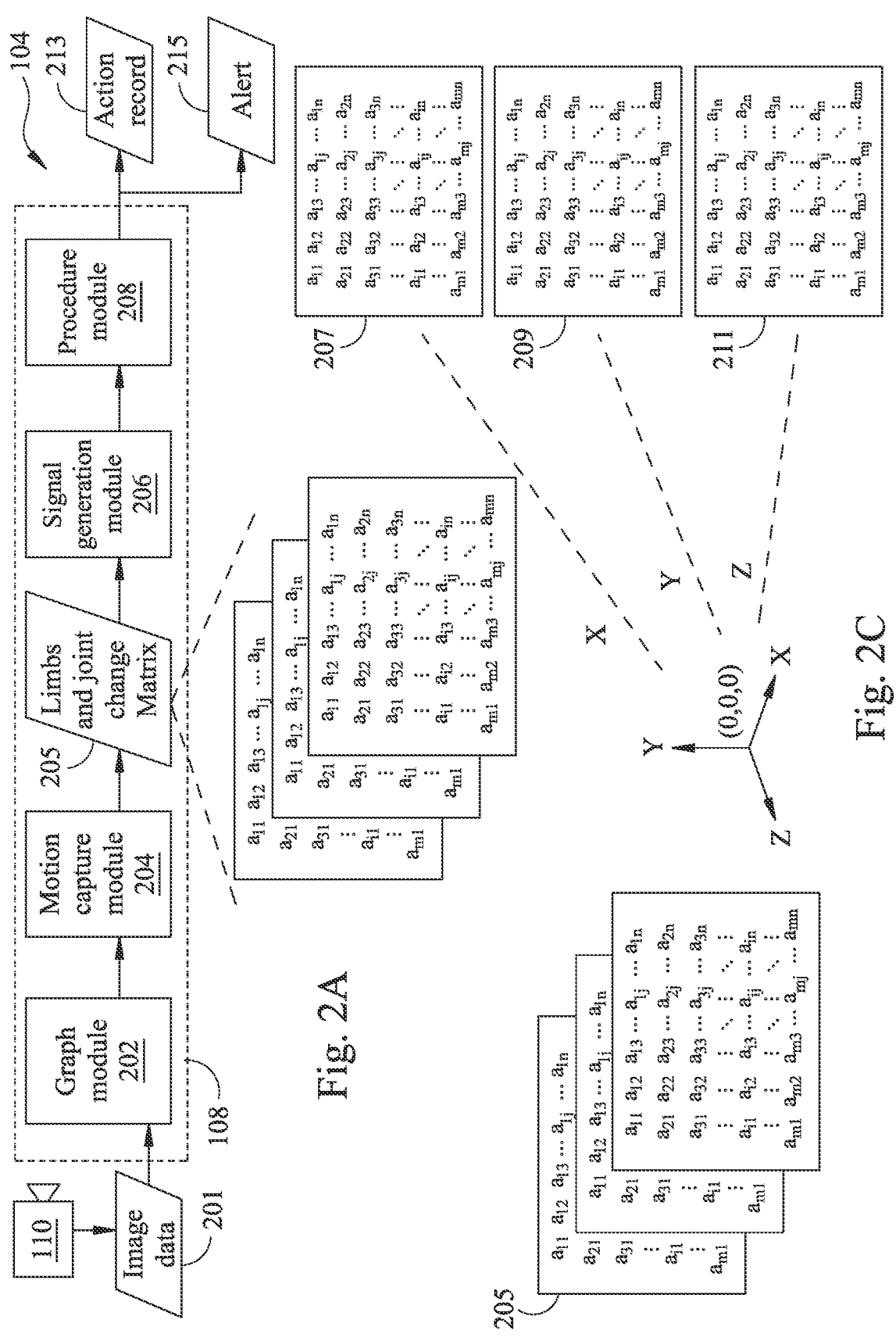
FIG. 2A is a block diagram depicting an example procedure detection system for automatically detecting whether installation and/or monitoring steps were performed by a human worker with semiconductor fabrication equipment, in accordance with some embodiments.
FIG. 2C is a diagram illustrating breaking down a limbs and joint change matrix to an X direction matrix, a Y direction matrix, and a Z direction matrix, in accordance with some embodiments.

FIG. 2A is a block diagram depicting an example procedure detection system 104 for automatically detecting whether installation and/or monitoring steps were performed by a human worker with semiconductor fabrication equipment. The example procedure detection system 104 includes an imaging device 110 and a controller 108.

The example controller 108 implements a graph module 202, a motion capture module 204, a signal generation module 206, and a procedure module 208. The example graph module 202 receives image data 201 captured from the imaging device 110 that captures movements by a human worker around semiconductor fabrication equipment. The example graph module 202 analyzes the received image data 201 using computer vision techniques to determine the physical position or coordinates (e.g., Cartesian coordinates) of various data points on the body of a human worker shown in the image data 201. In various embodiments, the example graph module 202 uses human pose estimation (HPE) techniques to determine a human pose skeleton of the human worker.

Human pose estimation (HPE) is a computer vision technique for identifying and classifying the joints in the human body that are in an image. HPE can be performed using top-down pose estimation or bottom-up pose estimation. Top-down pose estimation involves using image detection software to identify candidates for humans in an image, draw a bounding box around the identified human candidates, and then for the image segment within the bounding box for each detected human analyze the image segment to predict human joints. Bottom-up pose estimation involves using image detection software to detect all human joints in an image, and then assemble the human joints into human pose skeletons for the humans in the image. HPE can generate a set of Cartesian coordinates for each joint.

FIG. 2B is a diagram depicting an example human pose skeleton 220 that can be used for human pose estimation and tracking. The example human pose skeleton 220 includes a set of data points (e.g., 0-13) that are connected to describe an individual's pose. Each data point (e.g., 0-13) in the human pose skeleton 220 can also be called a part or coordinate, or point. A relevant connection between two coordinates is known as a limb 222 or pair 224. Human pose estimation and tracking is a computer vision task that includes detecting (i.e., detecting all parts of each person within an image), associating (i.e., associating or grouping the parts that belong to each individual), and tracking key points (e.g., estimating the position of key parts and recognizing changes in position measurements of the key parts to determine actions performed). Examples of key points include "shoulder right," "knee left," "Hand left," or any of the other points (0-13).

Referring back to FIG. 2A, the example graph module 202 implements a graph algorithm that analyzes the image data 201 to predict the poses of human body parts and joints in the image data 201. In various embodiments, the example graph module 202 receives the image data 201 captured via an imaging device, and based on imaging device location the graph algorithm estimates position measurements (e.g., X, Y, Z coordinates) for human body parts and joints. Based on the position measurement of the human body parts and joints, the graph algorithm predicts the pose of the human body parts and joints in the image data 201.

Because pose changes are often driven by some specific human actions, knowing the body pose of a human can allow for action recognition. In an example, to wash a part a human worker may take hold of the part by one hand and by that hand move the part up and down five times in a cleaning solution. In this example, the imaging device captures the hand moving up and down five times. The graph algorithm estimates the hand position at various points while the hand moves up and down. By recognizing the changing body pose-different hand positions consistent with the hand being moved up and down five times-recognition of the action that the part has been washed can occur.

In various embodiments, the example graph module 202 implements a graph algorithm that employs bottom-up methods to estimate each body joint first and then group them to form a unique pose. In various embodiments, the example graph module 202 implements a graph algorithm that employs top-down methods wherein object or person detection is performed first, and body joints are estimated within the detected bounding boxes for the detected person. Examples of graph algorithms that may be employed in the example graph module 202 for human pose estimation include OpenPose, High-Resolution Net (HRNet)—a neural network for human pose estimation, DeepCut, Regional Multi-Person Pose Estimation (AlphaPose), DeepPose-which uses deep neural networks, PoseNet-which is built on tensorflow.js, DensePose, TensorFlow Pose Estimation-which uses a machine learning (ML) model, Tensorflow Lite-which uses a lightweight ML model, and others.

The example motion capture module 204 captures point data for the key points that is output from the graph module 202. The point data includes a point position for a key point. The point position can be specified using set of Cartesian coordinates (X, Y, Z). In various embodiments the example motion capture module 204 stores the point data output in a limbs and joint change matrix 205. The limbs and joint change matrix 205 include values representing position estimates for the key points (e.g., limbs and joints of the human skeleton) at different instances in time, for example, for each frame of image data or at periodic time intervals.

As illustrated in FIG. 2C, the limbs and joint change matrix 205 can be separated into an X direction matrix 207, a Y direction matrix 209, and a Z direction matrix 211. The X. Y. and Z direction matrices can define precision position measurements for the limbs and joints of the human skeleton.

Referring back to FIG. 2A, the example signal generation module 206 is configured to generate pose position signals (e.g., voltage signals) based on the precision position measurements for the limbs and joints of the human skeleton. In various embodiments, the pose position signals are generated by applying digital to analog conversion to the precision position measurements plus scaling (via a predetermined scale factor) and/or applying an offset (via a predetermined offset). In various embodiments the pose position signals are continuous signals generated based on the precision position measurements. The pose position signals may be displayed via a measurement device such as an oscilloscope. Changes in the pose position signal waveforms indicate changes in pose positions.

Figure 2D:
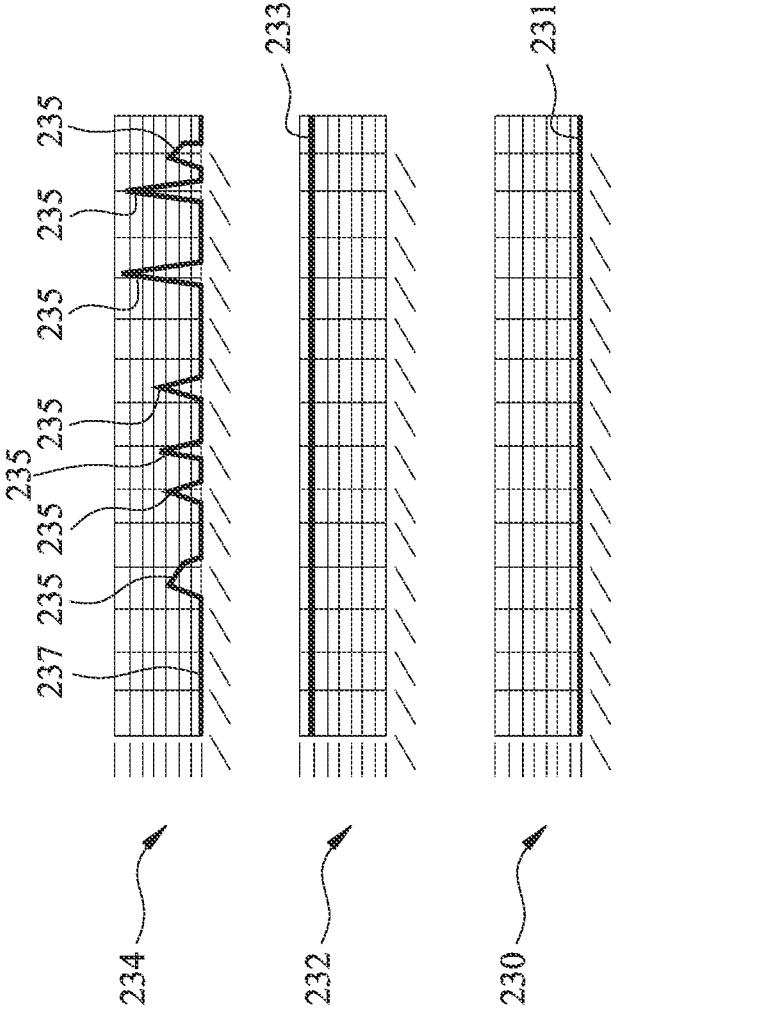
FIG. 2D is a diagram depicting example pose position signals that may be generated by the example signal generation module.

FIG. 2D is a diagram depicting example pose position signals that may be generated by the example signal generation module 206. Depicted are an X-axis pose position signal 230, a Y-axis pose position signal 232, and a Z-axis pose position signal 234 for a body joint. Each of the X-axis pose position signal 230, the Y-axis pose position signal 232, and the Z-axis pose position signal 234, in this example, are continuous signals (but in other examples may not be continuous) generated from the X. Y, and Z direction matrices (207, 209, 211), respectively. In this illustration, the X-axis pose position signal 230 is at a first constant level 231, and the Y-axis pose position signal 232 is at a second constant level 233. The Z-axis position signal 234 has a waveform shape with seven areas or pulses (235) in which the Z-axis position signal 234 rises above its baseline level 237 and then returns to its baseline level. In the case of position signals for a hand, this can indicate that the hand has been moved up and down seven times. Based on the timing of when these up and down actions occurred, these actions may correspond to a particular sequence of actions in a parts fabrication process such as a clean part step (e.g., hand moving a part into and out of a cleaning solution) or an ampoule checking step (e.g., a hand shaking an ampoule).

Referring back to FIG. 2A, the example procedure module 208 is configured to determine from the pose position signals generated by the signal generation module 206 whether a particular action that is expected to be performed by the human worker has been performed and generate an action record 213 that records the occurrence of the action. In various embodiments, the example procedure module 208 determines whether certain waveform patterns are shown in the pose position signals in a particular timeframe. The waveform patterns may be determined by observing the pose position signals by various techniques such as signal measurements (e.g., voltage measurements by a meter), visual observation (e.g., observing pose position signals displayed on a meter via computer vision techniques), and others techniques. By determining that certain waveform patterns occur in a particular timeframe, the example procedure module 208 can determine whether a particular action that is expected to be performed by the human worker has been performed.

In various embodiments, different waveform patterns are associated with different actions. For example, a series of 5-10 spikes in the Y-pose position signal may indicate side to side motion of a hand consistent with shaking an ampoule during a scheduled ampoule check or a series of five spikes in the Z-pose position signal may indicate up and down motion consistent with dipping a part into a cleaning solution. In various embodiments, the example procedure module 208 uses machine learning (ML) techniques to determine whether a particular action that is expected to be performed has been performed based on the pose position signals. For example, the example procedure module 208 can include ML techniques (such as neural networks, deep learning neural networks, convolutional neural networks, and others) that are trained to recognize when a particular action that is expected to be performed has been performed based on the X, Y, and/or Z pose position signals.

In various embodiments, the example procedure module 208 is configured to generate an alert 215 when an expected action has not been performed by the human worker in a time frame in which the human worker was expected to perform the expected action. For example, the example procedure module 208 may generated an audible alarm (such as ringing), a visual alert such as flashing lights or a message on a computer screen, or a notification (e.g., email or text message) to a handheld device (of the human worker or others) such as a smartphone when an expected ampoule check was not sensed to have occurred during the timeframe in which an ampoule check was expected to occur.

FIG. 3 is a process flow chart depicting an example process 300 of automatically detecting whether a procedure in a scheduled process has been performed. In various embodiments, the example process 300 is performed by a procedure detection system, such as the example procedure detection system 104.

At block 302, the process 300 includes capturing images of a person engaged in a plurality of predetermined steps in a scheduled process. The captured images may be video input from images, videos, or camera streams from a camera, webcam, forward-looking infrared (FLIR) camera, Point Grey camera, CCD camera, CMOS digital camera, Internet protocol (IP) camera, closed-circuit television camera (CCTV), custom input source (such as depth cameras, stereo lens cameras, etc.), or other imaging device.

At block 304, the process 300 includes estimating a human pose of the person in the captured images that includes a plurality of body parts of the human pose. In various embodiments, estimating the human pose includes detecting the plurality of body parts and forming a skeleton structure of the human pose by joining the body parts. The human pose may be estimated using top-down pose estimation or bottom-up pose estimation. Top-down pose estimation involves using image detection software to identify candidates for humans in an image, draw a bounding box around the identified human candidates, and then for the image segment within the bounding box for each detected human analyze the image segment to predict human joints. Bottom-up pose estimation involves using image detection software to detect all human joints in an image, and then assemble the human joints into human pose skeletons for the humans in the image.

At block 306, the process 300 includes tracking movement of the plurality of body parts of the human pose. In various embodiments, tracking movement of the plurality of body parts of the human pose includes capturing position measurements of the plurality of body parts in a position matrix.

At block 308, the process 300 includes generating pose position signals based on the tracked movement of the plurality of body parts of the human pose. In various embodiments, generating pose position signals includes converting captured position measurements into continuous signals, for example, using digital to analog conversion techniques. In various embodiments, a pose position signal indicates when a predetermined sequence of motions by the person has been performed. In various embodiments, generating a pose position signal based on the tracked movement includes generating the pose position signal based on a change in position measurements for a body parts in the position matrix. In various embodiments, the pose position signal corresponds to a predetermined sequence of motions. In various embodiments, determining that the change in position measurements corresponds to a predetermined sequence of motions includes determining based on machine learning techniques. For example, determining that the change in position measurements corresponds to a predetermined sequence of motions can include determining based on machine learning techniques (such as neural networks, deep learning neural networks, convolutional neural networks, and others) that are trained to recognize when the change in position measurements corresponds to a predetermined sequence of motions.

At block 310, the process 300 includes determining based on the pose position signal whether a predetermined step of the plurality of predetermined steps in the scheduled process has been performed by the person. In various embodiments, determining based on the pose position signal whether a predetermined step of the plurality of predetermined steps in the scheduled process has been performed comprises determining whether the predetermined sequence of motions that has been performed corresponds to a predetermined step of the plurality of predetermined steps in the scheduled process.

At block 312, the process 300 includes recording a time at which the predetermined step of the plurality of predetermined steps in the scheduled process has been performed by the person when it has been determined that the predetermined step has been performed. In various embodiments, the process 300 further includes providing an alert (aural, visual, both) when a predetermined step of the plurality of predetermined steps in the scheduled process has not been performed by the person.

Figure 4:
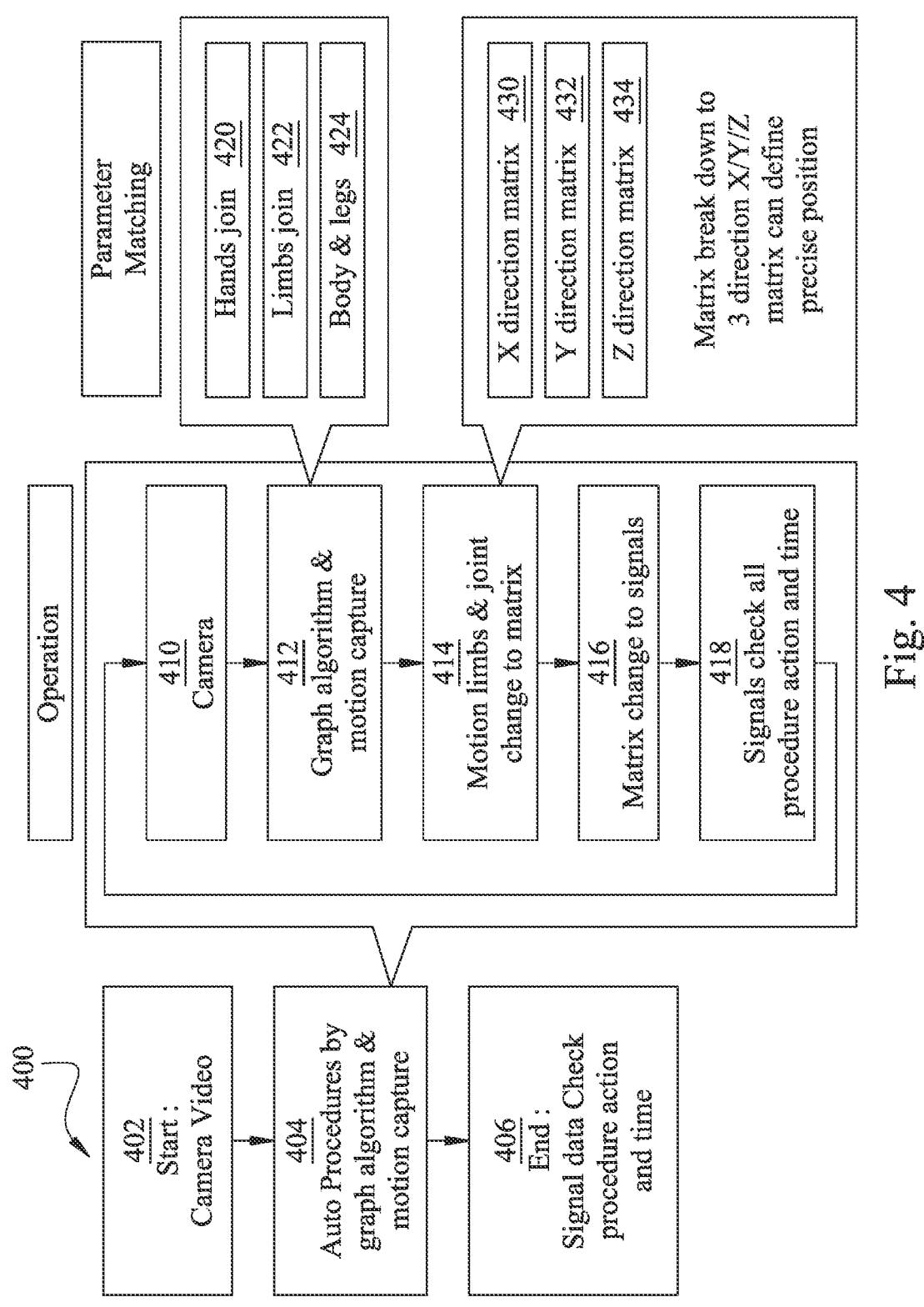
FIG. 4 is a process flow chart depicting an example process of detecting whether a procedure in a scheduled process has been performed, in accordance with some embodiments.

FIG. 4 is a process flow chart depicting an example process 400 of detecting whether a procedure in a scheduled process has been performed. For example, the example process 400 can be used to determine if a part cleaning step or an ampoule check step has been performed.

At block 402, the process 400 includes generating camera video that includes images of a person engaged in a plurality of predetermined steps in a scheduled process. The camera video may be from a camera, webcam, forward-looking infrared (FLIR) camera, Point Grey camera, CCD camera, CMOS digital camera, Internet protocol (IP) camera, closed-circuit television camera (CCTV), custom input source (such as depth cameras, stereo lens cameras, etc.), or other imaging device.

At block 404, the process 400 includes automatically generating signal data (e.g., a plurality of continuous or non-continuous voltage signals that indicate the motion of various human body parts over time in various directions) that indicates when certain predetermined procedures have been performed by a human participant. In various embodiments, the signal data is generated using a graph algorithm (e.g., implemented by the graph module 202) for human pose estimation and a motion capture system (e.g., implemented by the motion capture module 204). In various embodiments, the motion capture system captures point data (e.g., position data) for key points that are output from the graph algorithm and stores the point data output (e.g., in a limbs and joint change matrix 205) at different instances in time, for example, for each frame of image data or at periodic time intervals. Examples of graph algorithms that may be employed for human pose estimation include Open-Pose, HRNet, DeepCut, AlphaPose, DeepPose, PoseNet, DensePose, TensorFlow Pose Estimation, TensorFlow Lite, and others. At block 406, the process 400 further includes checking the signal data (e.g., checking for pulses in the signal data representative of certain body parts that indicate an up-and-down or side-to-side motion) to determine if and when the certain predetermined procedures were performed.

In various embodiments, block 404 includes receiving (at block 410) camera video, estimating (at block 412) a human pose of a person in the camera video using a graph algorithm (e.g., using graph module 202) and a motion capture system (e.g., motion capture module 204), capturing (at block 414) position measurements of a plurality of body parts (e.g., limbs and joints) in a position matrix (e.g., using motion capture module 204), converting (at block 416) values in the position matrix to motion signals (e.g., using signal generation module 206), and performing (at block 418) signal checks on the motion signals (e.g., checking for pulses in the signal data representative of certain body parts that indicate an up-and-down or side-to-side motion) to determine if all predetermined procedure actions have been taken at the appropriate time (e.g., using procedure module 208).

In various embodiments, estimating the human pose at block 412 includes detecting a plurality of body parts and forming a skeleton structure of the human pose by joining the body parts. In various embodiments, the plurality of body parts include hand join data 420, limbs join data 422, and body and legs data 424.

In various embodiments, capturing position measurements of a plurality of body parts (e.g., limbs and joints) in a position matrix at block 414 includes breaking down a limbs and joint change position matrix to an X direction matrix 430, a Y direction matrix 432, and a Z direction matrix 434. The X, Y, and Z direction matrices can define precision position measurements for the limbs and joints of the human skeleton.

FIG. 5 is a flowchart of an example method 500 for automatically detecting whether a procedure in a scheduled process has been performed. In various embodiments, the example method 500 is performed by a procedure detection system, such as the example procedure detection system 104. At step 510, method 500 includes capturing image data of a person engaged in a plurality of predetermined steps in the scheduled process.

At step 520, method 500 includes analyzing the image data using computer vision techniques to estimate position measurements for a plurality of body parts of the person in the image data. Analyzing the image data using computer vision techniques may include applying a graph algorithm to estimate the position measurements for the plurality of body parts and predict a pose for the plurality of body parts based on the position measurements.

At step 530, method 500 includes capturing the position measurements in a position matrix. At step 540, method 500 includes for a body part, separating the position measurements in the position matrix into an X direction matrix, a Y direction matrix, and a Z direction matrix for the body part.

At step 550, method 500 includes generating an X-axis pose position signal, a Y-axis pose position signal, and a Z-axis pose position signal for the body part based on position measurements in the X direction matrix, Y direction matrix, and Z direction matrix. Generating an X-axis pose position signal, a Y-axis pose position signal, and a Z-axis pose position signal may include applying digital to analog conversion techniques to data in the X direction matrix, Y direction matrix, and Z direction matrix. In various embodiments, the X-axis pose position signal, Y-axis pose position signal, and Z-axis pose position signal are voltage signals.

At step 560, method 500 includes determining based on at least one of the X-axis pose position signal, Y-axis pose position signal, and Z-axis pose position signal whether a predetermined step of the scheduled process has been performed by the person. Determining based on at least one of the X-axis pose position signal, Y-axis pose position signal, and Z-axis pose position signal whether a predetermined step of the scheduled process has been performed may include determining whether a waveform shape is consistent with the predetermined step of the scheduled process. Determining based on at least one of the X-axis pose position signal, Y-axis pose position signal, and Z-axis pose position signal whether a predetermined step of the scheduled process has been performed may include determining whether a sequence of pulses in the waveform shape is consistent with the predetermined step of the scheduled process. Determining based on at least one of the X-axis pose position signal, Y-axis pose position signal, and Z-axis pose position signal whether a predetermined step of the scheduled process has been performed may include determining whether the waveform shape is consistent with the predetermined step of the scheduled process using machine learning techniques.

At step 570, method 500 includes recording a time at which the predetermined step has been performed by the person. Predetermined actions for the method 500 can be monitored and recorded. In various embodiments, an automatic alert can be provided when a predetermined action was not taken. In various embodiments, the alert includes an audible alarm, a visual alert, or a notification sent to a handheld device.

In some aspects, the techniques described herein relate to a procedure detection system for automatically detecting whether a procedure in a scheduled process has been performed, the procedure detection system including: an imaging device for capturing image data of a person engaged in a plurality of predetermined steps in the scheduled process; and a controller configured to: estimate a human pose of the person in the captured images that includes a plurality of body parts of the human pose; track movement of the plurality of body parts of the human pose; generate a movement signal based on the tracked movement of the plurality of body parts of the human pose; determine based on the movement signal whether a predetermined step of the plurality of predetermined steps in the scheduled process has been performed by the person; and record a time at which the predetermined step of the plurality of predetermined steps in the scheduled process has been performed by the person when it has been determined that the predetermined step has been performed.

In some aspects, the techniques described herein relate to a procedure detection system, wherein the controller is configured to estimate the human pose by detecting the plurality of body parts and forming a skeleton structure of the human pose by joining the body parts.

In some aspects, the techniques described herein relate to a procedure detection system, wherein the controller is configured to track movement of the plurality of body parts of the human pose by capturing position measurements of the plurality of body parts in a position matrix.

In some aspects, the techniques described herein relate to a procedure detection system, wherein the movement signal indicates when a predetermined sequence of motions by the person has been performed.

In some aspects, the techniques described herein relate to a procedure detection system, wherein to generate the movement signal based on the tracked movement the controller is configured to generate the movement signal based on a change in position measurements for the plurality of body parts in the position matrix.

In some aspects, the techniques described herein relate to a procedure detection system, wherein the movement signal corresponds to a predetermined sequence of motions.

In some aspects, the techniques described herein relate to a procedure detection system, wherein the controller is configured to determine that the change in position measurements corresponds to a predetermined sequence of motions based on machine learning techniques.

In some aspects, the techniques described herein relate to a procedure detection system, wherein the controller is configured to determine based on the movement signal whether a predetermined step of the plurality of predetermined steps in the scheduled process has been performed by the person by determining whether the predetermined sequence of motions that has been performed corresponds to a predetermined step of the plurality of predetermined steps in the scheduled process.

In some aspects, the techniques described herein relate to a procedure detection system, wherein the controller is further configured to provide an alert when a predetermined step of the plurality of predetermined steps in the scheduled process has not been performed by the person.

In some aspects, the techniques described herein relate to a method of automatically detecting whether a procedure in a scheduled process has been performed, the method including: capturing image data of a person engaged in a plurality of predetermined steps in the scheduled process; analyzing the image data using computer vision techniques to estimate position measurements for a plurality of body parts of the person in the image data; capturing the position measurements in a position matrix; for a body part, separating the position measurements in the position matrix into an X direction matrix, a Y direction matrix, and a Z direction matrix for the body part; generating an X-axis pose position signal, a Y-axis pose position signal, and a Z-axis pose position signal for the body part based on position measurements in the X direction matrix, Y direction matrix, and Z direction matrix; determining based on at least one of the X-axis pose position signal, Y-axis pose position signal, and Z-axis pose position signal whether a predetermined step of the scheduled process has been performed by the person; and recording a time at which the predetermined step has been performed by the person.

In some aspects, the techniques described herein relate to a method, wherein analyzing the image data using computer vision techniques includes applying a graph algorithm to estimate the position measurements for the plurality of body parts and predict a pose for the plurality of body parts based on the position measurements.

In some aspects, the techniques described herein relate to a method, wherein generating an X-axis pose position signal, a Y-axis pose position signal, and a Z-axis pose position signal include applying digital to analog conversion techniques to data in the X direction matrix, Y direction matrix, and Z direction matrix.

In some aspects, the techniques described herein relate to a method, wherein the X-axis pose position signal, Y-axis pose position signal, and Z-axis pose position signal are voltage signals.

In some aspects, the techniques described herein relate to a method, wherein determining based on at least one of the X-axis pose position signal, Y-axis pose position signal, and Z-axis pose position signal whether a predetermined step of the scheduled process has been performed includes determining whether a waveform shape is consistent with the predetermined step of the scheduled process.

In some aspects, the techniques described herein relate to a method, wherein determining based on at least one of the X-axis pose position signal, Y-axis pose position signal, and Z-axis pose position signal whether a predetermined step of the scheduled process has been performed includes determining whether a sequence of pulses in the waveform shape is consistent with the predetermined step of the scheduled process.

In some aspects, the techniques described herein relate to a method, wherein determining based on at least one of the X-axis pose position signal, Y-axis pose position signal, and Z-axis pose position signal whether a predetermined step of the scheduled process has been performed includes determining whether the waveform shape is consistent with the predetermined step of the scheduled process using machine learning techniques.

In some aspects, the techniques described herein relate to a non-transitory computer readable medium encoded with programming instructions configurable to cause a processor to perform a method of automatically detecting whether a procedure in a scheduled process has been performed, the method including: detecting, using a graph algorithm, a plurality of body parts of a person engaged in a plurality of predetermined steps in the scheduled process from image data captured of the person; estimating position measurements for the plurality of body parts of the person in the image data using the graph algorithm; capturing the position measurements in a position matrix; for a body part, separating the position measurements in the position matrix into an X direction matrix, a Y direction matrix, and a Z direction matrix for the body part; generating an X-axis pose position signal, a Y-axis pose position signal, and a Z-axis pose position signal for the body part based on position measurements in the X direction matrix, Y direction matrix, and Z direction matrix; determining based on at least one of the X-axis pose position signal, Y-axis pose position signal, and Z-axis pose position signal whether a predetermined step of the scheduled process has been performed by the person; recording a time at which the predetermined step has been performed by the person; and providing an alert when an expected step of the scheduled process has not been performed.

In some aspects, the techniques described herein relate to a non-transitory computer readable medium, wherein the alert includes an audible alarm, a visual alert, or a notification sent to a handheld device.

In some aspects, the techniques described herein relate to a non-transitory computer readable medium, detecting the plurality of body parts includes applying top-down pose estimation or bottom-up pose estimation.

In some aspects, the techniques described herein relate to a non-transitory computer readable medium, wherein determining based on at least one of the X-axis pose position signal, Y-axis pose position signal, and Z-axis pose position signal whether a predetermined step of the scheduled process has been performed by the person includes applying machine learning techniques to determine whether the predetermined step of the scheduled process has been performed by the person.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A semiconductor manufacturing system comprising:
   a semiconductor processing chamber configured to perform semiconductor processing operations on a semiconductor structure;
   an imaging device configured to capture image data of a person engaged in a plurality of predetermined installation steps with the semiconductor processing chamber prior to a semiconductor processing operation or a plurality of predetermined monitoring steps during a semiconductor processing operation; and
   a controller configured to:
      estimate position measurements for a plurality of body parts of the person in the captured image data;
      capture the position measurements in a position matrix;
      for a body part, separate the position measurements in the position matrix into an X direction matrix, a Y direction matrix, and a Z direction matrix for the body part;
      generate an X-axis pose position signal, a Y-axis pose position signal, and a Z-axis pose position signal for the body part based on position measurements in the X direction matrix, Y direction matrix, and Z direction matrix, wherein the X-axis pose position signal, the Y-axis pose position signal, and the Z-axis pose position signal are generated by applying digital to analog conversion techniques to data in the X direction matrix, Y direction matrix, and Z direction matrix;
      determine based on at least one of the X-axis pose position signal, Y-axis pose position signal, and Z-axis pose position signal whether the person performed an expected; and
      record a time at which the person performed the expected step.

2. The semiconductor manufacturing system of claim 1, wherein the controller is configured to estimate a human pose by detecting the plurality of body parts and forming a skeleton structure of the human pose by joining the plurality of body parts.

3. The semiconductor manufacturing system of claim 1, wherein the controller is configured to track movement of the plurality of body parts of a human pose using the position measurements of the plurality of body parts in the position matrix.

4. The semiconductor manufacturing system of claim 3, wherein one or more of the X-axis pose position signal, the Y-axis pose position signal, and the Z-axis pose position signal indicates when a predetermined sequence of motions by the person has been performed.

5. The semiconductor manufacturing system of claim 4, wherein the controller is configured to generate the X-axis pose position signal, Y-axis pose position signal, and Z-axis pose position signal based on a change in position measurements for the plurality of body parts in the position matrix.

6. The semiconductor manufacturing system of claim 5, wherein one or more of the X-axis pose position signal, Y-axis pose position signal, and Z-axis pose position signal corresponds to a predetermined sequence of motions.

7. The semiconductor manufacturing system of claim 6, wherein the controller is configured to determine that one or more of the X-axis pose position signal, Y-axis pose position signal, and Z-axis pose position signal corresponds to a predetermined sequence of motions based on machine learning techniques.

8. The semiconductor manufacturing system of claim 5, wherein the X-axis pose position signal, Y-axis pose position signal, and Z-axis pose position signal are voltage signals.

9. The semiconductor manufacturing system of claim 1, wherein the controller is further configured to provide an alert when the expected step has not been performed by the person.

10. A semiconductor manufacturing method comprising:
    performing a first fabrication operation on a semiconductor structure that introduced an unwanted substance on the semiconductor structure;
    performing, by a person, a plurality of predetermined steps prior to cleaning the unwanted substance from the semiconductor structure;
    capturing, via an imaging device, image data of the person engaged in the plurality of predetermined steps;
    analyzing the image data using computer vision techniques to estimate position measurements for a plurality of body parts of the person in the image data;
    capturing the position measurements in a position matrix;
    for a body part, separating the position measurements in the position matrix into an X direction matrix, a Y direction matrix, and a Z direction matrix for the body part;
    generating an X-axis pose position signal, a Y-axis pose position signal, and a Z-axis pose position signal for the body part based on position measurements in the X direction matrix, Y direction matrix, and Z direction matrix, wherein generating an X-axis pose position signal, a Y-axis pose position signal, and a Z-axis pose position signal comprise applying digital to analog conversion techniques to data in the X direction matrix, Y direction matrix, and Z direction matrix;
    determining based on at least one of the X-axis pose position signal, Y-axis pose position signal, and Z-axis pose position signal whether the person performed an expected step;
    recording a time at which the person performed the expected step; and
    cleaning the unwanted substance from the semiconductor structure.

11. The method of claim 10, wherein analyzing the image data using computer vision techniques comprises applying a graph algorithm to estimate the position measurements for the plurality of body parts and predict a pose for the plurality of body parts based on the position measurements.

12. The method of claim 10, further comprising providing an alert when the expected step has not been performed.

13. The method of claim 10, wherein the X-axis pose position signal, Y-axis pose position signal, and Z-axis pose position signal are voltage signals.

14. The method of claim 13, wherein determining based on at least one of the X-axis pose position signal, Y-axis pose position signal, and Z-axis pose position signal whether the expected step has been performed comprises determining whether a waveform shape is consistent with the expected step.

15. The method of claim 14, wherein determining based on at least one of the X-axis pose position signal, Y-axis pose position signal, and Z-axis pose position signal whether the expected step has been performed comprises determining whether a sequence of pulses in the waveform shape is consistent with the expected step.

16. The method of claim 14, wherein determining based on at least one of the X-axis pose position signal, Y-axis pose position signal, and Z-axis pose position signal whether the expected step has been performed comprises determining whether the waveform shape is consistent with the expected step using machine learning techniques.

17. A semiconductor manufacturing method comprising:

performing, by a person, a plurality of predetermined steps to determine a parameter associated with a chemical in an ampoule;

detecting, using a graph algorithm, a plurality of body parts of the person engaged in the plurality of predetermined steps from image data captured of the person;

estimating position measurements for the plurality of body parts of the person in the image data using the graph algorithm;

capturing the position measurements in a position matrix;

for a body part, separating the position measurements in the position matrix into an X direction matrix, a Y direction matrix, and a Z direction matrix for the body part;

generating an X-axis pose position signal, a Y-axis pose position signal, and a Z-axis pose position signal for the body part based on position measurements in the X direction matrix, Y direction matrix, and Z direction matrix, wherein generating an X-axis pose position signal, a Y-axis pose position signal, and a Z-axis pose position signal comprise applying digital to analog conversion techniques to data in the X direction matrix, Y direction matrix, and Z direction matrix;

determining based on at least one of the X-axis pose position signal, Y-axis pose position signal, and Z-axis pose position signal whether a predetermined step of the plurality of predetermined steps has been performed by the person;

recording a time at which the predetermined step has been performed by the person;

providing an alert when an expected step of the plurality of predetermined steps has not been performed;

installing the ampoule in a deposition chamber; and performing a deposition operation in the deposition chamber using the ampoule.

18. The method of claim 17, wherein the alert comprises an audible alarm, a visual alert, or a notification sent to a handheld device.

19. The method of claim 17, detecting the plurality of body parts comprises applying top-down pose estimation or bottom-up pose estimation.

20. The method of claim 17, wherein determining based on at least one of the X-axis pose position signal, Y-axis pose position signal, and Z-axis pose position signal whether the expected step has been performed by the person comprises applying machine learning techniques to determine whether the expected step has been performed by the person.

* * * * *